United States Patent
Ekanayake et al.

(10) Patent No.: US 9,945,266 B2
(45) Date of Patent: Apr. 17, 2018

(54) COMBINED CYCLE POWER PLANT THERMAL ENERGY CONSERVATION

(71) Applicant: General Electric Company, Schenectady, NY (US)

(72) Inventors: Sanji Ekanayake, Mableton, GA (US); Julio Enrique Mestroni, Powder Springs, GA (US); Alston I. Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 14/820,739

(22) Filed: Aug. 7, 2015

(65) Prior Publication Data

US 2016/0061061 A1 Mar. 3, 2016

Related U.S. Application Data

(60) Provisional application No. 62/042,816, filed on Aug. 28, 2014.

(51) Int. Cl.
| | |
|---|---|
| *F01K 23/10* | (2006.01) |
| *F02C 7/00* | (2006.01) |
| *F01D 25/34* | (2006.01) |
| *F02C 6/18* | (2006.01) |
| *F02C 7/12* | (2006.01) |

(52) U.S. Cl.
CPC .............. *F01K 23/10* (2013.01); *F01D 25/34* (2013.01); *F02C 6/18* (2013.01); *F02C 7/00* (2013.01); *F02C 7/12* (2013.01); *Y02E 20/16* (2013.01)

(58) Field of Classification Search
CPC .... F01K 23/10; F02C 7/00; F02C 7/12; F02C 6/18; F01D 25/34
See application file for complete search history.

(56) References Cited

U.S. PATENT DOCUMENTS

| | | | |
|---|---|---|---|
| 8,210,801 B2 * | 7/2012 | Ballard, Jr. ............. | F01D 11/24 415/115 |
| 8,359,824 B2 | 1/2013 | Zhang et al. | |
| 8,635,876 B2 | 1/2014 | Ceric et al. | |
| 8,726,625 B2 | 5/2014 | Holt et al. | |

(Continued)

OTHER PUBLICATIONS

Co-pending U.S. Appl. No. 14/820,728, filed Aug. 7, 2015.

*Primary Examiner* — Carlos A Rivera
(74) *Attorney, Agent, or Firm* — Dority & Manning, P.A.

(57) ABSTRACT

A combined cycle power plant includes a gas turbine having a primary flow passage, a heat recovery steam generator having a heat exchanger disposed downstream from the primary flow passage, an exhaust stack in fluid communication with the primary flow passage and disposed downstream from the heat recovery steam generator and a reversible turning gear coupled to a rotor shaft of the gas turbine. The reversible turning gear counter rotates the rotor shaft during turning gear counter rotation operation of the gas turbine and reverses flow of combustion exhaust gas from the exhaust stack through the heat exchanger and back into the primary flow passage of the gas turbine, thereby conserving thermal energy stored in the heat recovery steam generator. A method for conserving thermal energy of a combined cycle power plant during counter rotation turning gear operation of the gas turbine is also disclosed.

19 Claims, 4 Drawing Sheets

(56) References Cited

U.S. PATENT DOCUMENTS

| | | | |
|---|---|---|---|
| 2005/0034445 A1* | 2/2005 | Radovich | F01K 13/02 60/39.182 |
| 2010/0095648 A1 | 4/2010 | Zhang et al. | |
| 2012/0260667 A1 | 10/2012 | Chillar et al. | |
| 2016/0061060 A1* | 3/2016 | Ekanayake | F02C 6/04 60/772 |

* cited by examiner

COMBINED CYCLE POWER PLANT THERMAL ENERGY CONSERVATION

CROSS-REFERENCE TO RELATED APPLICATIONS

The present application is based upon and claims priority to U.S. Provisional Patent Application No. 62/042,816, filed on Aug. 28, 2014, the disclosure of which is hereby incorporated by reference herein in its entirety for all purposes.

FIELD OF THE INVENTION

The present invention generally involves a combined cycle power plant. More specifically, the invention relates to a system and method for conserving thermal energy within a heat recovery steam generator portion of the combined cycle power plant during turning-gear and/or non-fired operation of the gas turbine.

BACKGROUND OF THE INVENTION

One type of combined cycle gas turbine power plant utilizes at least one gas turbine and at least one steam turbine, in combination, to produce electric power. The power plant is arranged such that the gas turbine is thermally connected to the steam turbine through a heat recovery system such as a heat recovery steam generator ("HRSG"). The gas turbine generally includes a compressor section, a combustion section disposed downstream from the compressor section and a turbine section which is downstream from the combustion section. A rotor shaft of the gas turbine is coupled to a generator. A rotor shaft of the steam turbine may be coupled to the same generator or to a separate generator.

The HRSG generally includes one or more heat exchangers which are positioned downstream from a turbine exhaust duct of the gas turbine. During fired operation of the gas turbine, hot combustion exhaust gases flow from the exhaust duct, through the HRSG and out an exhaust stack. Thermal energy from the hot combustion exhaust gas is transferred via the heat exchanger(s) to a working fluid such as water so as to provide a flow of pressurized steam to the steam turbine(s).

In certain instances, the gas turbine may be operated primarily during peak or high power demand periods and shut down during non-peak or low demand periods. During a shut-down or non-fired operational period, however, it may be generally desirable to keep the rotor shaft of the gas turbine rotating at some desired minimal rotational speed via a turning gear which is coupled to an electric motor in order to protect the gas turbine rotor from bowing.

As the rotor is turned via the turning gear, ambient air is drawn through the compressor section, routed into a compressor discharge casing of the combustion section, routed through the turbine section out the exhaust duct and then through the HRSG. Although the air flowing from the compressor during turning gear operation may realize a slight increase in thermal energy, the temperature of the air passing from the compressor into the HRSG may be lower than the temperature of the working fluid residing in the heat exchangers of the HRSG, particularly soon after fired-operation of the gas turbine has ceased. As a result, thermal energy from the working fluid within the heat exchanger is lost to the cooler exhaust air.

The loss of thermal energy from the working fluid in the HRSG during turning gear operation may negatively impact overall power plant performance. For example, additional time may be required to bring the working fluid within the HRSG back to a required operating temperature before full operation of both the gas turbine and the steam turbine may be realized. In addition, a large temperature differential between the working fluid in the HRSG and the hot turbine exhaust gas, particularly during the initial start-up period, may result in thermal stresses on various components of the HRSG which may impact overall HRSG performance. Accordingly, a system and method for conserving thermal losses from the HRSG working fluid during turning gear operation of the gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a combined cycle power plant. The combined cycle power plant includes a gas turbine having a primary flow passage, a heat recovery steam generator having a heat exchanger disposed downstream from the primary flow passage, an exhaust stack in fluid communication with the primary flow passage and disposed downstream from the heat recovery steam generator and a reversible turning gear coupled to a rotor shaft of the gas turbine. The reversible turning gear counter rotates the rotor shaft during turning gear counter rotation operation of the gas turbine and reverses flow of combustion exhaust gas from the exhaust stack through the heat exchanger and back into the primary flow passage of the gas turbine, thereby conserving thermal energy stored in the heat recovery steam generator.

Another embodiment of the present disclosure is a method for conserving thermal energy of a combined cycle power plant during turning gear operation. The combined cycle power plant including a gas turbine having a rotor shaft, a heat recovery steam generator downstream from an exhaust outlet of the gas turbine and an exhaust stack downstream from the heat recovery steam generator. The method comprises the steps of routing combustion exhaust gas from the gas turbine through the heat recovery steam generator and into the exhaust stack during fired operation of the gas turbine where the rotor shaft rotates in a regular rotational direction and shutting down the combustion section of the gas turbine, thus allowing the rotor shaft to slow and eventually stop. The method further includes counter rotating the rotor shaft of the gas turbine via a reversible turning gear where the counter rotation of the rotor shaft draws the combustion exhaust gas from the exhaust stack in a reverse flow direction, back through the heat recovery steam generator and through a primary flow passage of the gas turbine.

The present invention also includes a method for conserving thermal energy of a combined cycle power plant. The combined cycle power plant includes a gas turbine having a rotor shaft, a heat recovery steam generator downstream from an exhaust outlet of the gas turbine and an exhaust stack downstream from the heat recovery steam generator. The method comprises the steps of routing combustion exhaust gas from the gas turbine through the heat recovery steam generator and into the exhaust stack during fired operation of the gas turbine where the rotor shaft rotates in a regular rotational direction. The method further includes shutting down the combustion section of the gas turbine, thus allowing the rotor shaft to slow to a sufficient speed to engage a reversible turning gear for rotating the rotor shaft. The method also includes the step of counter rotating the rotor shaft via the reversible turning gear where counter rotation of the rotor shaft draws the combustion exhaust gas from the exhaust stack in a reverse flow direction, back through the heat recovery steam generator and through a primary flow passage of the gas turbine. The method further includes measuring a temperature of the combustion exhaust gas exhaust as it exits an inlet section of the gas turbine, and comparing the measured combustion exhaust gas temperature to a predefined maximum compressor inlet temperature where if the measured temperature is below the predefined maximum compressor inlet temperature, the turning gear continues to rotate the counter rotate the rotor shaft and if the temperature is above the predefined maximum compressor inlet temperature the turning gear stops the counter rotation of the rotor shaft and resumes regular rotation of the rotor shaft.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
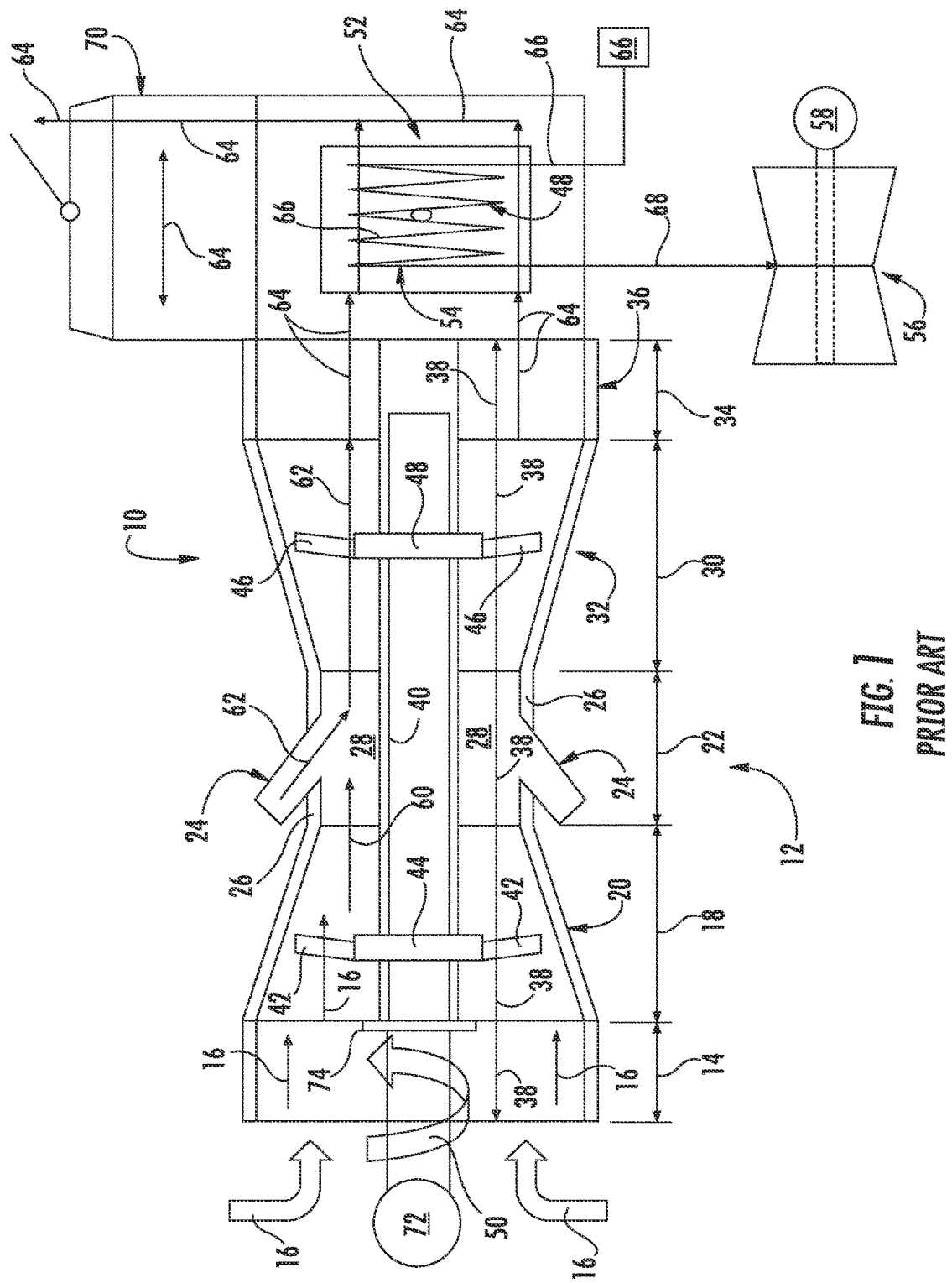
FIG. 1 is a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combined cycle power plant having a single gas turbine, a single steam turbine and a single heat recovery steam generator, particularly a single heat exchanger, for purposes of illustration, one of ordinary skill in the art will readily appreciate that embodiments of the present invention may be applied to any combined cycle power plant having multiple gas turbines, steam turbines and/or multiple HRSG units.

Referring now to the drawings, wherein identical numerals indicate the same elements throughout the figures, FIG. 1 provides a functional block diagram of an exemplary combined cycle power plant 10 that may incorporate various embodiments of the present invention. As shown in FIG. 1, the power plant 10 generally includes a gas turbine 12. The gas turbine 12 generally includes an inlet section 14 that may include a series of filters, cooling coils, moisture separators, and/or other devices (not shown) to purify and otherwise condition air 16 entering the gas turbine 12. A compressor section 18 including a compressor 20 is disposed downstream from the inlet section 14. A combustion section 22 including a plurality of combustors 24 annularly arranged around an outer casing 26 such as a compressor discharge casing is disposed downstream from the compressor 20. In particular embodiments, the outer casing 26 defines a high pressure plenum 28 therein.

A turbine section 30 including a high and/or low pressure turbine 32 is disposed downstream from the combustion section 22. In one embodiment, the gas turbine 32 includes an exhaust section 34 which includes an exhaust duct or diffuser 36 which is disposed downstream from an outlet of the turbine 32. In particular embodiments, the inlet section 14, compressor 20, outer casing 26 of the combustion section 22, turbine 32 and the exhaust duct 36 define a primary flow passage 38 through the gas turbine 12.

A rotor shaft 40 extends along an axial centerline of the gas turbine 12. The rotor shaft 40 may be a single shaft or may include multiple shafts coupled together to form a singular shaft through the gas turbine 12. The compressor 20 generally includes multiple rows or stages of compressor blades 42 where each row of compressor blades 42 is coupled to the rotor shaft 40 via a compressor rotor disk 44. In addition, the turbine 32 generally includes multiple rows or stages of turbine blades 46 where each row of turbine blades is coupled to the rotor shaft 40 via a turbine rotor disk 48. The compressor and turbine blades 42, 46 are generally mounted, angled and/or formed such that regular rotation of the rotor shaft 40 in a regular rotational direction 50 causes the air 16 to be drawn through the inlet section 14 and into the compressor 20. Although illustrated as counter-clockwise, the regular rotational direction 50 may be either clockwise or counter-clockwise depending on the configuration of the compressor and turbine blades 42, 46.

The combined cycle power plant 10 also includes a heat recovery steam generator 52 which is disposed downstream from at least one of the turbine 32 and the exhaust duct 36. The heat recovery steam generator 52 generally includes at least one heat exchanger 54 which is in fluid communication with the primary flow passage 38 of the gas turbine 12. The heat exchanger 52 is fluidly coupled to one or more steam turbines 56 which may be connected to a generator 58 for producing electrical power.

During fired operation of the gas turbine 12 where the rotor shaft 40 rotates in the regular rotational direction 50, the rotating compressor blades 42 cause the air 16 to pass through the inlet section 14 and into the compressor 20 where it is progressively compressed as it progresses along the primary flow passage 38, thus providing compressed air 60 to the combustion section 22. At least a portion of the compressed air 60 is routed into the various combustors 24 where it is mixed with fuel to provide a combustible fuel-air mixture. The fuel-air mixture in each combustor 24 is burned to provide combustion gases 62 at high temperature, pressure and velocity. The combustion gases 62 are then routed into the turbine 32 wherein kinetic energy is transferred from the combustion gases 62 via the turbine rotor blades 48, thus causing the rotor shaft 40 to rotate.

The combustion gas 64 exits the turbine 32 and flows through the exhaust duct 36 as combustion exhaust gas 64. The combustion exhaust gas 64 flows through and/or across the heat exchanger 54 of the heat recovery steam generator 52 where a portion of remaining thermal energy from the combustion exhaust gas 64 is transferred to a working fluid 66 such as water via the heat exchanger 54. The thermal energy transferred is generally sufficient to convert the working fluid 66 to steam 68. The steam 68 is then routed to the steam turbine 56. The combustion exhaust gas 64 is then routed through an exhaust stack or exhaust duct 70 and is typically vented to atmosphere. The combustion exhaust gas 64 retains an appreciable amount of thermal energy even after flowing across the heat exchanger 54 of the heat recovery steam generator 52. Additionally, when the unit is shut down and on turning gear operation, heat transfer may be from the working fluid in the heat recovery steam generator to the air flow induced by turning gear operation of the gas turbine compressor.

Figure 2:
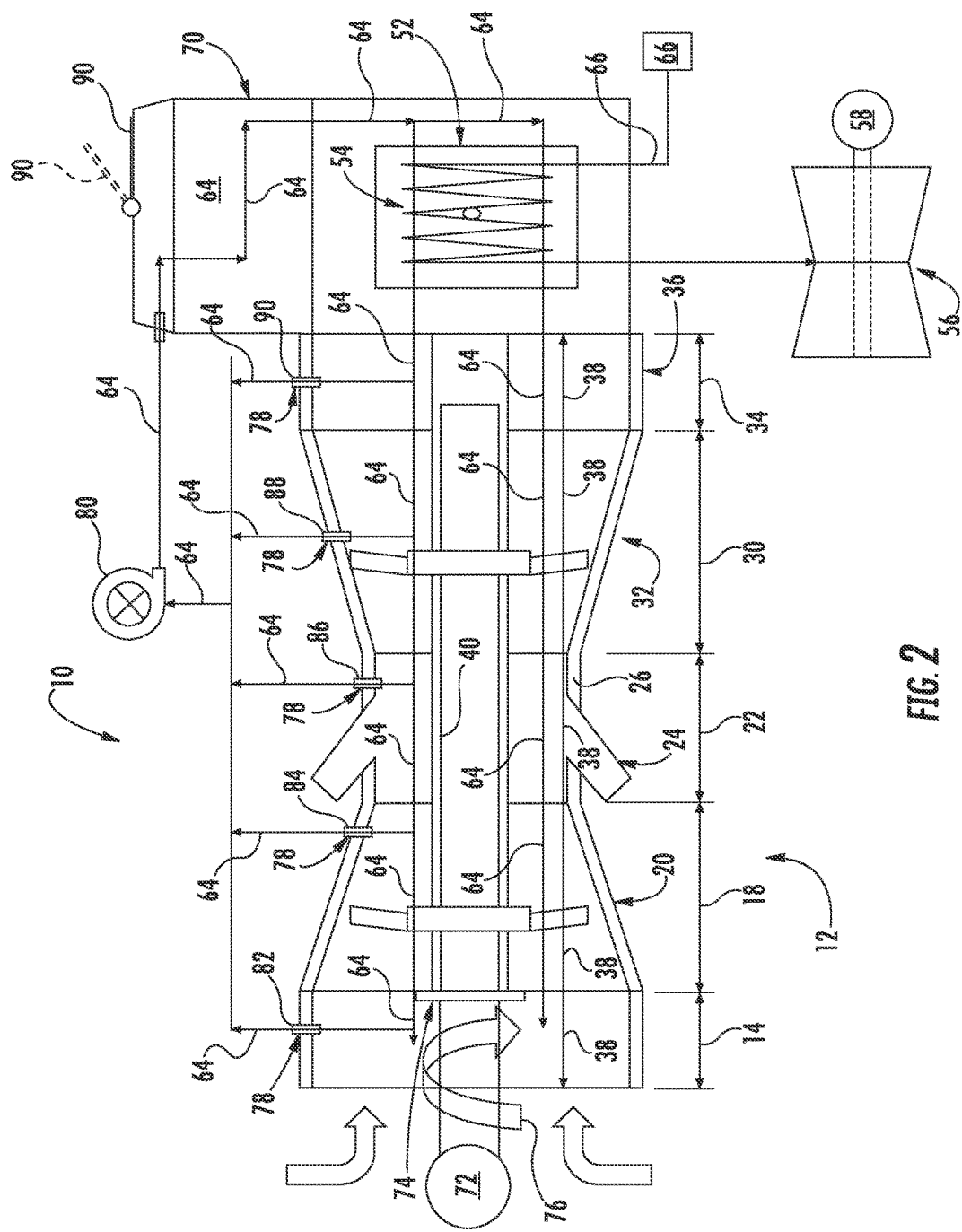
FIG. 2 is a functional block diagram of an exemplary gas as shown in FIG. 1, according to various embodiments of the present invention.

FIG. 2 provides a schematic side view of the exemplary combined cycle power plant 10 as shown in FIG. 1, according to various embodiments of the present invention. In various embodiments, as shown in FIGS. 1 and 2, a generator/motor 72 is coupled to the rotor shaft 40 via a turning gear 76. In particular embodiments, the turning gear 76 and/or the motor 72 is reversible. In other words, the turning gear 76 and/or the motor 72 are configured to rotate the rotor shaft 40 in either the regular rotational direction 50 (FIG. 1) or in a counter rotational direction 76 (FIG. 2) which is opposite or counter to the regular rotational direction 50.

In certain embodiments, as shown in FIG. 2, the gas turbine 12 includes one or more bleed air outlets 78 which are in fluid communication with a blower or air pump 80 and with the primary flow passage 38. The bleed air outlet(s) 78 may be disposed at various points along the gas turbine 12. For example, in one embodiment, a bleed air outlet 82 is disposed along inlet section 14 and is in fluid communication with a portion of the primary flow passage 38 defined within the inlet section 14. In one embodiment, a bleed air outlet 84 is disposed along the compressor 20 of the compressor section 18 and is in fluid communication with a portion of the primary flow passage 38 defined within the compressor 20. In one embodiment, a bleed air outlet 86 is disposed along the outer casing 26 of the combustion section 22 and in in fluid communication with a portion of the primary flow passage 38 defined within the outer casing 26 and/or the high pressure plenum 28. In one embodiment, a bleed air outlet 88 is disposed along the turbine 32 of the turbine section 30 and is in fluid communication with a portion of the primary flow passage 38 defined within the turbine 32. In one embodiment, a bleed air outlet 90 is disposed along the exhaust duct 36 of the exhaust section 34 and is in fluid communication with a portion of the primary flow passage 38 defined within the exhaust duct 36.

The combined cycle power plant 10 may include any or all the bleed air outlets 78 as shown in FIG. 2. The bleed air outlets 78 are not limited to any particular location along a particular section or component of the gas turbine 12 unless specifically recited in the claims.

The blower 80 may include any blower motor, air pump or apparatus suitable for drawing the air 16 and/or combustion exhaust gas 64 from the primary flow passage 38 in the corresponding section or component of the gas turbine 12 during counter rotational turning gear operation of the gas turbine 12. In particular embodiments, the blower 80 is in fluid communication with the exhaust stack 70, thus providing a flow passage between the primary flow passage 38 and the exhaust stack 70.

In particular embodiments the exhaust stack 70 includes at least one moveable hatch 92. When in a closed or at least partially closed position, the hatch 92 seals or at least partially seals the exhaust stack 70 from atmosphere. When in an open condition, as shown in dotted lines, the hatch 92 allows the combustion exhaust gas 64 to vent to the atmosphere. In one embodiment, the hatch 92 is at least partially closed so as to retain at least a portion of the combustion exhaust gas 64 within the exhaust stack 70.

Conventionally, once the gas turbine 12 is shut down or operating in a non-fired condition, the turning gear 76 is engaged in order to keep the rotor shaft 40 rotating, thus reducing the potential for bowing of the rotor shaft 40 and/or to improve start-up time required to bring the combined cycle power plant 10 back online. However, as the turning gear 76 rotates the rotor shaft 40 in the regular rotational direction 50, ambient air 16 is drawn through the inlet 14 and into the compressor 20 where it flows along the primary flow passage 38 through the outer casing 26 of the combustion section 22, through the turbine 32, through the exhaust duct 36 and across the heat exchanger 54 of the heat recovery steam generator 52. The air 16 flowing across the heat exchanger 54 is relatively cool when compared to the working fluid 66 being stored within the heat exchanger 54. As a result, thermal energy is lost to the cooler air 16, thus potentially reducing overall efficiency of the heat recovery steam generator 52 and/or the combined cycle power plant 10.

Figure 3:
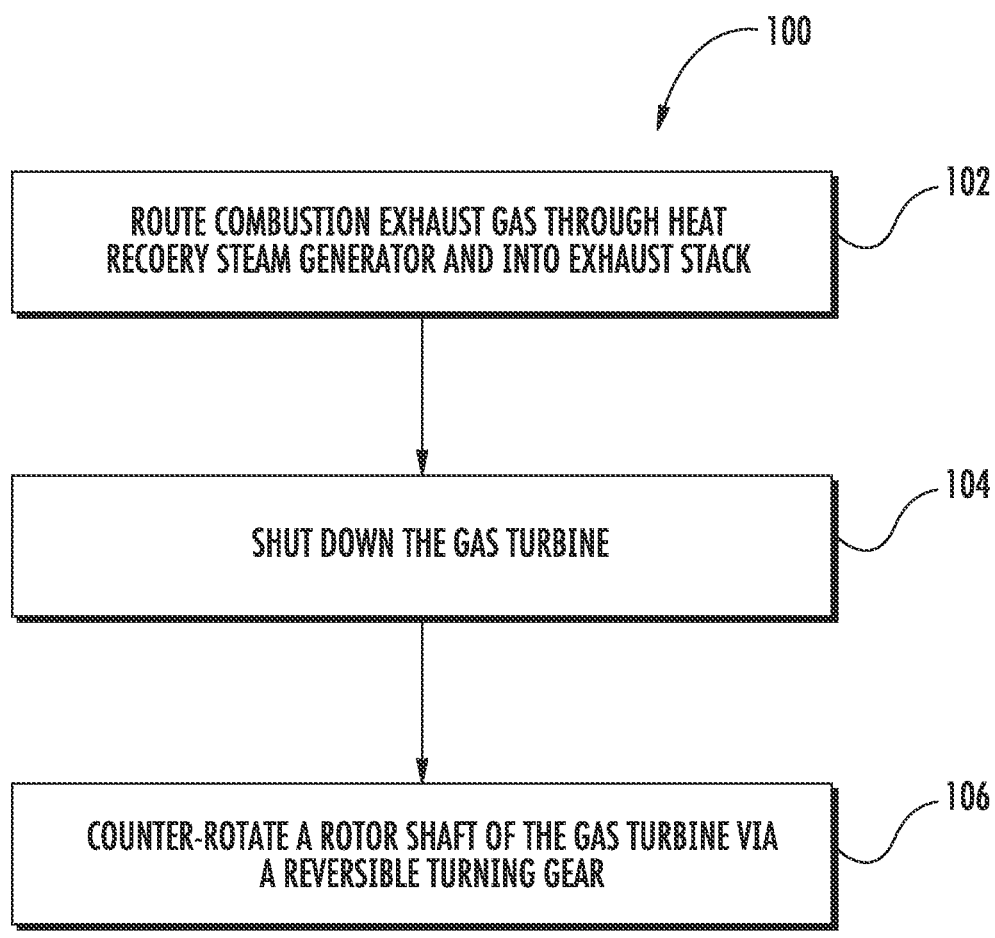
FIG. 3 is a block diagram representing a method for conserving thermal energy of a combined cycle power plan as shown in FIG. 2, according to one embodiment of the present invention.

The various embodiments of the combined cycle power plant 10 as described herein and as illustrated in FIGS. 1 and 2, provide for a method 100 for conserving the thermal energy stored in the heat recovery steam generator 52, particularly in the working fluid 64 stored within the heat exchanger 54 or heat exchangers of the heat recovery steam generator 52 during turning gear operation of the gas turbine 12. For example, at step 102, as shown in FIG. 3 and as illustrated in FIG. 1, the method 100 includes routing the combustion exhaust gas 64 from the gas turbine 12 through the heat recovery steam generator 52 and into the exhaust stack 70 during fired operation of the gas turbine 12, wherein the rotor shaft 40 rotates in the regular rotational direction 50 (FIG. 1). At step 104, as shown in FIG. 3, the method 100 includes shutting down the combustion section 22 of the gas turbine 12. Shutting down the combustion section 22 may include reducing or shutting off a fuel supply to the combustors 24. The method 100 may further include allowing the rotor shaft 40 to slow down and/or stop momentarily so that the turning gear 76 and/or motor 72 may be engaged after shutting down the combustion section 22 of the gas turbine 12.

At step 106 as shown in FIG. 3 and as illustrated in FIG. 2, the method includes counter rotating the rotor shaft 40 (in the counter rotational direction 76) via the turning gear 74 and/or the motor 72 where the counter rotation of the rotor shaft 40 draws the combustion exhaust gas 64 from the exhaust stack in a reverse flow direction, back through the heat recovery steam generator 52 and at least partially through the primary flow passage 38. For example, the combustion exhaust gas 64 may enter the exhaust duct 36, flow through the turbine 32, the combustion section 22 and the compressor 20 and then flow towards and/or out the inlet section 14. Because the combustion exhaust gas 64 is hotter than the air 16 from atmosphere, the rate of heat transfer between the combustion exhaust gas 64 and the working fluid 64 stored in the heat exchanger 54 is reduced, thus the system can conserve thermal energy stored in the heat recovery steam generator 52 and can improve overall efficiency of the combined cycle power plant 10.

In particular embodiments, the method 100 may further include measuring temperature of the combustion exhaust gas 64 within a section of the gas turbine 12. The temperature may be measured by one or more thermocouples or any other suitable sensor or sensors (not shown). The temperature may be taken at any one or multiple locations. For example, the temperature may be measured in one or more of the exhaust stack 70, the heat recovery steam generator 52, the exhaust duct 36, the turbine 32, the combustion section 22, the compressor 18 and/or the inlet section 14.

In one embodiment, the method 100 also may include stopping the counter rotation of the rotor shaft 40 and resuming regular rotation of the rotor shaft 40 when a measured temperature within a section of the gas turbine 12 including but not limited to the heat recovery steam generator 52 and/or the exhaust stack 70 is above a predefined limit. For example, various components found in the inlet section 14, such as air filters may have certain maximum temperature limits, for example in the 150 to 250 degree Fahrenheit range which may be well below the temperature of the combustion exhaust gas 64.

In particular embodiments, the method 100 includes routing at least a portion of the combustion exhaust gas 64 from the primary flow passage 38 back into the exhaust stack 70 via various fluid conduits during counter rotation turning gear operation of the gas turbine 12. As a result, latent thermal energy remaining in the recirculated combustion exhaust gas 64 my may be used to reduce the heat transfer rate between the combustion exhaust gas 64 and working fluid 66 in the heat exchanger 54, thus the system can conserve thermal energy stored in the heat recovery steam generator 52 and improve overall efficiency of the combined cycle power plant 10.

In particular embodiments, the method 100 also may include energizing the blower 80 during counter rotation turning gear operation where the blower 80 is fluidly coupled to one or more of the bleed air outlets 78 (FIG. 2) and where the one or more bleed air outlets 78 are in fluid communication with the primary flow passage 38. This may reduce the volume of the combustion exhaust gas 64 being routed towards the inlet section 14, thus the system can maintain an acceptable temperature at the inlet section 14, while also using latent thermal energy remaining in the recirculated combustion exhaust gas 64 to further conserve thermal energy stored in the heat recovery steam generator 52 and improve overall efficiency of the combined cycle power plant 10.

In one embodiment, the method 100 may further include at least partially sealing the exhaust stack 70 via the hatch 92 (FIG. 2) from atmosphere during counter rotation turning gear operation of the gas turbine, thus the system can conserve thermal energy stored in the heat recovery steam generator 52 and improve overall efficiency of the combined cycle power plant 10.

Figure 4:
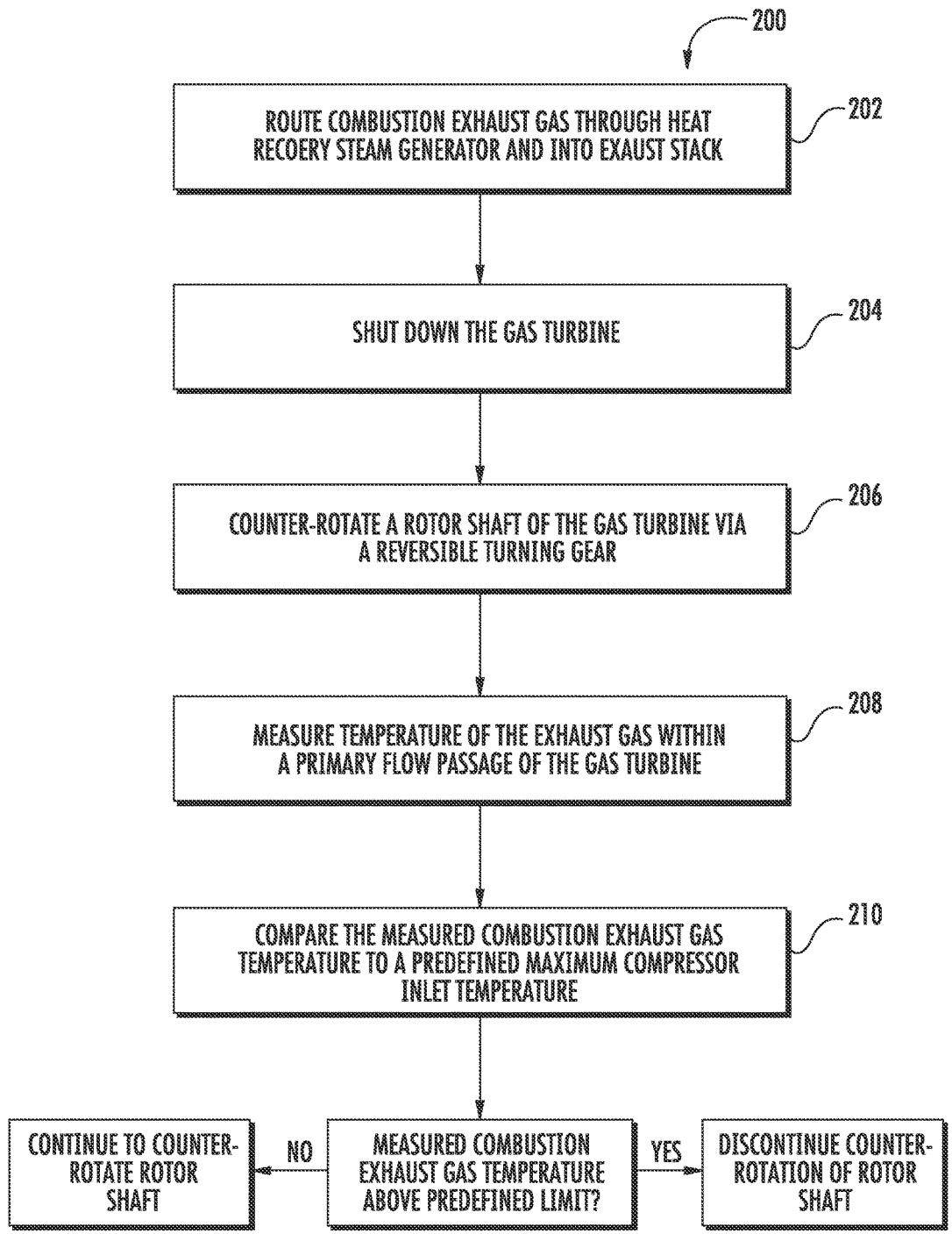
FIG. 4 is a block diagram representing a method for conserving thermal energy of a combined cycle power plan as shown in FIG. 2, according to one embodiment of the present invention.

FIG. 4 provides a flow diagram of a method 200 for conserving thermal energy of a combined cycle power plant 10 according to one embodiment of the present invention. At step 202, the method 200 includes routing combustion exhaust gas 64 from the gas turbine 12 through the heat recovery steam generator 52 and into the exhaust stack 70 during fired operation of the gas turbine 12. At step 204 the method 200 includes shutting down the combustion section 22 of the gas turbine 12. At step 206, the method 200 includes counter rotating the rotor shaft 40 via the reversible turning gear 74 and/or the motor 72 where the counter rotation of the rotor shaft 40 draws the combustion exhaust gas 64 from the exhaust stack 70 in a reverse flow direction, back through the heat recovery steam generator 52 and through the primary flow passage 38 of the gas turbine 12. At step 208 the method 200 includes measuring a temperature of the combustion exhaust gas 64 as it exits the inlet section 14 of the gas turbine 12. At step 210 the method 200 includes comparing the measured combustion exhaust gas 64 temperature to a predefined maximum compressor inlet temperature where if the measured temperature is below the predefined maximum compressor inlet temperature, the turning gear 74 continues to counter rotate the rotor shaft 40 and if the temperature is above the predefined maximum compressor inlet temperature the turning gear 74 and/or motor 72 stops the counter rotation of the rotor shaft 40 and resumes regular rotation of the rotor shaft 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combined cycle power plant, comprising:
   a gas turbine having a primary flow passage defined therein and a rotor shaft;
   a heat recovery steam generator having a heat exchanger disposed downstream from the primary flow passage;
   an exhaust stack in fluid communication with the primary flow passage and disposed downstream from the heat recovery steam generator; and
   a reversible turning gear coupled to the rotor shaft of the gas turbine, wherein the reversible turning gear counter rotates the rotor shaft during turning gear counter rotation operation of the gas turbine and reverses flow of combustion exhaust gas from the exhaust stack through the heat exchanger and back into the primary flow passage of the gas turbine.

2. The combined cycle power plant as in claim 1, wherein the primary flow passage is at least partially defined by one or more of an exhaust duct, a turbine, a compressor discharge casing, a compressor and an inlet.

3. The combined cycle power plant as in claim 1, wherein the exhaust stack includes a hatch, wherein the hatch at least partially seals an exhaust gas from the gas turbine within the exhaust stack.

4. The combined cycle power plant as in claim 1, wherein the gas turbine includes a bleed air outlet in fluid communication with the primary flow passage, wherein the bleed air outlet is fluidly coupled to the exhaust stack.

5. The combined cycle power plant as in claim 4, wherein the bleed air outlet is positioned along an inlet section of the gas turbine.

6. The combined cycle power plant as in claim 4, wherein the bleed air outlet is positioned along a compressor of the gas turbine.

7. The combined cycle power plant as in claim 4, wherein the bleed air outlet is positioned along an outer casing of a combustion section of the gas turbine.

8. The combined cycle power plant as in claim 4, wherein the bleed air outlet is positioned along a turbine of the gas turbine.

9. The combined cycle power plant as in claim 4, wherein the bleed air outlet is positioned along an exhaust duct of the gas turbine.

10. The combined cycle power plant as in claim 4, further comprising a blower fluidly coupled to the bleed air outlet and the exhaust stack, wherein the blower provides for fluid communication between the primary flow passage and the exhaust stack.

11. A method for conserving thermal energy of a combined cycle power plant during turning gear operation, the combined cycle power plant including a gas turbine having a rotor shaft, a heat recovery steam generator downstream from an exhaust outlet of the gas turbine and an exhaust stack downstream from the heat recovery steam generator, the method comprising:
routing combustion exhaust gas from the gas turbine through the heat recovery steam generator and into the exhaust stack during fired operation of the gas turbine, wherein the rotor shaft rotates in a regular rotational direction;
shutting down the combustion section of the gas turbine;
counter rotating the rotor shaft of the gas turbine via a turning gear, wherein counter rotation of the rotor shaft draws the combustion exhaust gas from the exhaust stack in a reverse flow direction, back through the heat recovery steam generator and through a primary flow passage of the gas turbine.

12. The method as in claim 11, further comprising measuring temperature of the combustion exhaust gas within a section of the gas turbine.

13. The method as in claim 12, further comprising stopping the counter rotation of the rotor shaft and resuming regular rotation of the rotor shaft when a measured temperature within a section of the gas turbine is above a predefined limit.

14. The method as in claim 13, wherein the predefined temperature limit is within a range of 125 to 250 degrees Fahrenheit at the compressor inlet.

15. The method as claim 11, further comprising energizing a blower during counter rotation turning gear operation, wherein the blower is fluidly coupled to a bleed air outlet and wherein the bleed air outlet is in fluid communication with the primary flow passage.

16. The method as in claim 15, further comprising routing at least a portion of the combustion exhaust gas from the primary flow passage through the bleed air outlet and into the exhaust stack via the blower.

17. The method as in claim 11, further comprising at least partially sealing the exhaust stack from atmosphere during counter rotation turning gear operation of the gas turbine.

18. The method as in claim 11, further comprising routing at least a portion of the combustion exhaust gas from the primary flow passage of the gas turbine back into the exhaust stack during counter rotation turning gear operation of the gas turbine.

19. A method for conserving thermal energy of a combined cycle power plant, the combined cycle power plant including a gas turbine having a rotor shaft, a heat recovery steam generator downstream from an exhaust outlet of the gas turbine and an exhaust stack downstream from the heat recovery steam generator, the method comprising:
routing combustion exhaust gas from the gas turbine through the heat recovery steam generator and into the exhaust stack during fired operation of the gas turbine;
shutting down the combustion section of the gas turbine;
counter rotating a rotor shaft of the gas turbine via a reversible turning gear, wherein counter rotation of the rotor shaft draws the combustion exhaust gas from the exhaust stack in a reverse flow direction, back through the heat recovery steam generator and through a primary flow passage of the gas turbine;
measuring a temperature of the combustion exhaust gas exiting an inlet section of the gas turbine; and
comparing the measured combustion exhaust gas temperature to a predefined maximum compressor inlet temperature, wherein if the measured temperature is below the predefined maximum compressor inlet temperature, continue counter rotation of the rotor shaft, if the temperature is above the predefined maximum compressor inlet temperature discontinue counter rotation of the rotor shaft.

* * * * *